Figure 1:
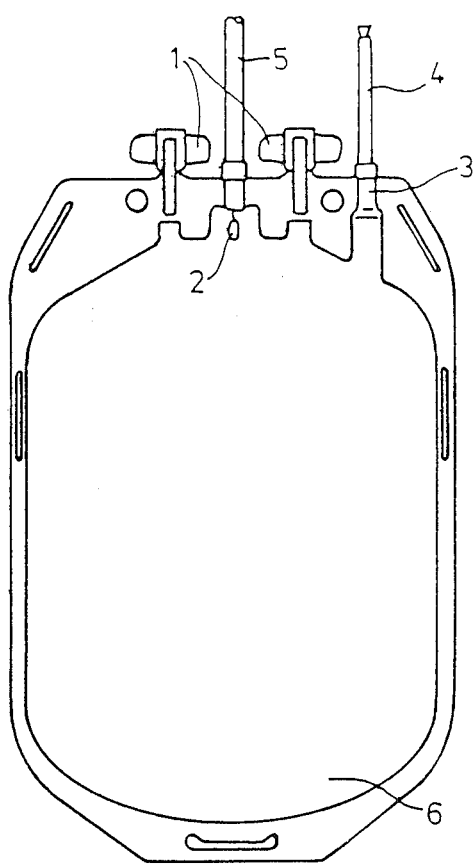

United States Patent [19]

Ermert et al.

[11] Patent Number: 4,810,451
[45] Date of Patent: Mar. 7, 1989

[54] PROCESS FOR THE PREPARATION OF POLYURETHANE FILMS FOR BLOOD OR INFUSION BAGS

[75] Inventors: Wolfgang Ermert, Fallingbostel; Hans-Egon Schieder; Hans-Werner Funk, both of Bomlitz, all of Fed. Rep. of Germany

[73] Assignee: Wolff Walsrode Aktiengesellschaft, Walsrode-Bomlitz, Fed. Rep. of Germany

[21] Appl. No.: 68,078

[22] Filed: Jun. 29, 1987

[30] Foreign Application Priority Data

Jul. 18, 1986 [DE] Fed. Rep. of Germany ....... 3624319

[51] Int. Cl.$^4$ .............................................. B29C 59/04
[52] U.S. Cl. ................................ 264/209.1; 264/210.2; 264/210.5; 264/284; 425/385
[58] Field of Search ................ 264/210.2, 216, 211.24, 264/210.5, 284, 209.1, 327; 425/385

[56] References Cited

U.S. PATENT DOCUMENTS

| | | | |
|---|---|---|---|
| 3,060,515 | 10/1962 | Corbett | 425/385 |
| 3,233,025 | 2/1966 | Frye et al. | 264/211.24 |
| 3,423,274 | 1/1969 | Lahm et al. | 264/237 |
| 3,624,045 | 11/1971 | Stivers | 264/347 |
| 3,857,144 | 12/1974 | Bustin | 264/284 |
| 3,966,383 | 6/1976 | Bussey, Jr. et al. | 264/284 |
| 3,994,654 | 11/1976 | Chyu | 264/177.1 |
| 4,245,081 | 1/1981 | Quiring et al. | 264/211.24 |

FOREIGN PATENT DOCUMENTS

| | | | |
|---|---|---|---|
| 2212751 | 10/1973 | Fed. Rep. of Germany | 264/516 |
| 3318875 | 3/1985 | Fed. Rep. of Germany | . |
| 54-154473 | 12/1979 | Japan | 264/280 |
| 61-51328 | 3/1986 | Japan | 264/232 |

Primary Examiner—Jeffery Thurlow
Attorney, Agent, or Firm—Sprung Horn Kramer & Woods

[57] ABSTRACT

Process for the preparation of translucent matt polyurethane films with a rough surface by extrusion of thermoplastic polyurethane elastomers to flat films or tubular films, characterized in that the extruded film is stored until it has a turbidity of > 15%, measured in accordance with ASTM D 1003, and the two film surfaces are then embossed with the aid of embossing rolls with a different number of grids, each in the range from 20 to 100 grids/cm$^2$, under a pressure of 5 to 20 bar at temperatures of 130° to 175° C.

3 Claims, 1 Drawing Sheet

PROCESS FOR THE PREPARATION OF POLYURETHANE FILMS FOR BLOOD OR INFUSION BAGS

The present invention relates to processes for the preparation of translucent matt polyurethane films with a rough surface, such as are described in claim 1, and their use for the production of blood or infusion bags.

It is already known from DE-OS (German Published Specification) No. 3,318,875 that films of polyurethanes can be used for the production of blood bags, since such films contain no plasticizers which can be dissolved out by blood or blood constituents. In addition, such bags of thermoplastic polyurethane elastomers have advantageous properties during the necessary low temperature storage and can be sterilized without difficulties.

The disadvantages of the films produced by customary extrusion processes is, however, that they have a smooth glossy surface which, during use as a blood bag material, means that not only do the individual bags stick to one another during storage and sterilization, but blood constituents can also be deposited on the bag walls.

Attempts to eliminate these disadvantages by embossing the film surfaces in the customary manner immediately after preparation of the film have not, however, led to the desired success. It has thus not been possible to obtain a translucent matt polyurethane film with a rough surface without structural defects.

Surprisingly, it is now possible to prepare translucent matt polyurethane films with a rough surface by the process according to the invention.

The present invention thus relates to a process for the preparation of translucent matt polyurethane films with a rough, structurally uniform surface by extruding films of thermoplastic polyurethane elastomers as flat films or tubular films, which is characterized in that the extruded film is stored until it has a turbidity of >15%, preferably ≧45%, measured in accordance with ASTM 1003, and the two film surfaces are then embossed with the aid of embossing rolls with a different number of grids, each in the range from 20 to 100, preferably 30 to 50, grids/cm², under a pressure of 5 to 20, preferably 8 to 12 bar and at temperatures of 130° to 175° C., preferably 150° to 170° C.

The invention also relates to blood and infusion bags of the polyurethane films thus prepared, these bags being particularly suitable for receiving, storing, preserving or deep-freezing blood, blood plasma, cellular blood constituents or liquid medicament formulations, such as infusion solutions.

The polyurethanes used are preferably thermoplastic polyurethane elastomers in which the diol component is derived from polyesters or polyethers and which have a Shore A hardness of 60 to 90 and a melt index of <100, preferably 20 to 30 (measured in accordance with ASTM 1268-62T at 8.7 kg/190° C.) g/10 minutes. Polyether-polyurethanes which are built up exclusively from aliphatic components are especially preferably used. Such polyurethanes are known commerical products.

The polyurethane films can be prepared as flat films or as tubular films by extrusion or by the film blow-moulding process. Extrusion is preferably carried out at temperatures of 150° to 220° C., particularly preferably at 165° to 185° C. Since the polyurethane films should be prepared as far as possible without additives for production of blood bags, extrusion to flat films is to be preferred to the film blow-moulding process, since in the former procedure the freshly extruded polyurethane films are easier to handle. Furthermore, only a negligibly small longitudinal and transverse stretching of the film occurs, which afterwards also leads to only a negligible shrinkage of the film material, for example during steam sterilization.

The freshly extruded films should be stored until a turbidity of preferably equal to or greater than 45%, measured in accordance with ASTM D 1003, occurs. Storage is preferably at 25° C., but the storage time can be shortened by increasing the storage temperature.

The thickness of the films should be in the range from 100 to 350 μm, preferably 150-250 μm.

For embossing, the film web is then passed in a known manner through at least 2 heated gravure rolls, which must have a different number of grids in each case in the range from 10 to 100, preferably 30 to 50 grids/cm². Preferably, the two film surfaces are not embossed simultaneously but in succession, and a temperature difference of at least 10° C., preferably 24 20° C., should preferably be maintained in the two embossing steps, and the 2nd embossing step should be carried out at higher temperatures.

The polyurethane films prepared according to the invention are distinguished in particular by their translucent matt appearance and also have a sufficiently rough surface without structural variations, which means they are outstandingly suitable for the production of blood or infusion bags. These are preferably produced by heat sealing the films obtained according to the invention, the heat-sealed seams being completely clear and transparent and easy to test for tightness by comparison with the matt rough surface.

The invention is illustrated in the drawing which is a front view of a blood bag in accordance with the invention.

The drawing and the invention are described in greater detail in the following illustrative example:

EXAMPLE (a) A thermoplastic polyether-polyurethane elastomer (Esthan ® 58309 type, from Goodridge) is extruded to a flat film on a casting roll at temperatures of 180° C. and the film is wound up. After storage for 2 days, the film has a turbidity of 45%, measured as described above, and can therefore be embossed on one side in an embossing unit consisting of a gravure roll with 70 grids/cm² and a steel roll as the back-up roll, at 142° C. under 10 bar. The non-embossed surface of the flat film is then embossed in another operation in an embossing unit consisting of a gravure roll which can be heated and has 30 grids/cm² and a steel roll as the back-up roll, at 165° C. under 10 bar. The polyether-polyurethane film is translucently matt and has a rough surface without structural variations.

(b) A blood bag such as is shown in FIG. 1 is produced by high frequency welding from the film obtained according to (a). This bag has a push-in connecting piece (1), a break-off part (2) and a tube set (3), a blood withdrawal tube (5) with a feed tube (4), and the actual blood bag (6). These blood bags display no sticking when sterilized at 123° C. and no deposition of blood constituents after storage for 14 days.

We claim:

1. Process for the preparation of translucent matt polyurethane films with a rough surface by extrusion of thermoplastic polyurethane elastomers to flat films or tubular films, characterized in that the extruded film is stored until it has a turbidity of ≧15%, measured in accordance with ASTM D 1003, and the two film surfaces are then embossed with the aid of embossing rolls with a different number of grids, each in the range from 20 to 100 grids/cm², under a pressure of 5 to 20 bar at temperatures of 130° to 175° C.

2. Process according to claim 1, characterized in that the film is stored until it has a turbidity of ≧45%.

3. Process according to claim 1, characterized in that the surfaces of the film are embossed in succession and at different temperatures.

UNITED STATES PATENT AND TRADEMARK OFFICE
CERTIFICATE OF CORRECTION

PATENT NO. : 4,810,451

DATED : Mar. 7, 1989

INVENTOR(S) : Ermert et al.

It is certified that error appears in the above-identified patent and that said Letters Patent is hereby corrected as shown below:

Title Page, under "Foreign Patent Documents", line 2    Correct date to 11/84

Col. 2, line 22    Delete "24" and substitute -- 2 --

Signed and Sealed this

Thirty-first Day of July, 1990

Attest:

HARRY F. MANBECK, JR.

*Attesting Officer*    *Commissioner of Patents and Trademarks*